United States Patent [19]
Shih et al.

[11] Patent Number: 5,573,718
[45] Date of Patent: Nov. 12, 1996

[54] PROCESS FOR PRODUCING α-ALUMINA FIBERS

[76] Inventors: Han-Chang Shih, 56, Lane 103, Sec. 1, Hsin-Sheng S. Rd.; Yuan-Horng Chiou, 6th Fl., No. 20, Alley 6, Lane 118, Sec. 2, Ho-Ping E. Rd., both of Taipei; Mu-Tsuan Tsai, 99, Wu-Lin St., Tou-Liu, all of Taiwan

[21] Appl. No.: 248,711

[22] Filed: May 25, 1994

[51] Int. Cl.$^6$ .................................................. B28B 1/00
[52] U.S. Cl. .................................. 264/56; 264/66; 501/95
[58] Field of Search .......................... 264/56, 66; 501/95

[56] References Cited

U.S. PATENT DOCUMENTS

| | | | |
|---|---|---|---|
| 3,322,865 | 5/1967 | Blaze | 264/0.5 |
| 3,953,561 | 4/1976 | Shin | 264/57 |
| 3,983,197 | 9/1976 | Mirsche et al. | 264/56 |

Primary Examiner—Christopher A. Fiorilla
Attorney, Agent, or Firm—Michael D. Bednarek; Kilpatrick & Cody

[57] ABSTRACT

α-Alumina fibers are produced by a sol-gel process using aluminum nitrate as a starting material. A reaction mixture including aluminum nitrate, water and aluminum particles is refluxed until the aluminum particles are completely dissolved to obtain an aluminum hydroxide sol. The aluminum hydroxide sol is then aged to increase the viscosity thereof, spun, dried and sintered to obtain α-alumina crystalline fibers.

7 Claims, No Drawings

PROCESS FOR PRODUCING α-ALUMINA FIBERS

BACKGROUND OF THE INVENTION

1. Field of the Invention

The present invention relates to a process for preparing α-alumina fibers, and more particularly to a process for preparing α-alumina fibers using aluminum nitrate as a starting material.

2. Description of the Prior Art

Since alumina fibers have relatively attractive properties such as a high melting point, high strength, good corrosion resistance, good wear resistance, and light weight, they are very suitable for use as reinforcements for structural materials.

For example, alumina fibers can be added to ceramics, metals or polymers to obtain ceramic matrix composites (CMC), metal matrix composites (MMC) or polymer matrix composites (PMC), as to increase flexibility, strength and high temperature resistance of the matrices.

Alumina fibers have been manufactured by a melt-spinning technique, which is a conventional technique for manufacturing glass fibers. However, since alumina has an extremely high melting point and the melt of it has low viscosity, therefore it is difficult to spin alumina into fibers.

Since the products obtained through application of a sol-gel technique display such characteristics such as high surface area, high strength, and good homogeneity, and the process can be performed at a lower temperature, thereby reducing energy consumption, the process for producing alumina fibers by the sol-gel technique has drawn the interest of many researchers recently.

Blaze in U.S. Pat. No. 3,322,865 discloses a process for manufacturing alumina fibers using aluminum chloride as a starting material. However, problem encountered therein is that the resultant alumina has the disadvantage of being porous since it is difficult to remove the chloride ion. Yogo and Iwahara disclose another process for producing alumina fibers, in which polymerizable organoaluminum compounds are used as the starting materials (J. Mater. Sci., 27, 1499–1504 (1992)). However, synthesis of such organoaluminum starting materials is difficult and costly.

SUMMARY OF THE INVENTION

It is therefore an object of this invention to provide an improved process for producing α-alumina fibers of high purity, full density and which contain no pores.

Another object of this invention is to produce α-alumina fibers using aluminum nitrate as a starting material, which is desirably inexpensive and readily obtained.

To achieve the above object, the process for preparing α-alumina fibers includes: (a) preparing a reaction mixture including aluminum nitrate [$Al(NO_3)_3 \cdot 9H_2O$], water and aluminum particles; (b) refluxing the reaction mixture until the aluminum particles are completely dissolved to give an aluminum hydroxide sol; (c) aging the aluminum hydroxide sol to a viscosity suitable for spinning; (d) spinning the viscous sol into fibers; and (e) drying and sintering the fibers to give α-alumina fibers.

DETAILED DESCRIPTION OF THE INVENTION

In accordance with the present invention, there is provided an improved process for producing α-aluminum fibers.

Aluminum nitrate is used as a starting material due to its high viscosity upon being dissolved in water, its stability in a concentrated viscous condition, its ability to decompose to its oxide on being heated to a sintering temperature, and its low cost.

Aluminum nitrate and aluminum particles are dissolved in water to produce a reaction mixture. Aluminum particles are used to increase the solid content of the reaction mixture to 19–25%. Treatment of the aluminum particles with a halogen-containing solution is required to make the aluminum particles dissolve in the reaction mixture easily. The halogen-containing solution suitable for use includes mercuric chloride solution and bromine solution.

The reaction mixture is refluxed until the aluminum particles are completely dissolved to produce an aluminum hydroxide sol. At this stage, the sol obtained is not viscous enough for spinning. Therefore, aging the sol is required to remove water and volatiles, thereby producing a viscous sol suitable for spinning. The appropriate viscosity is in the range from 1–4000 poises.

After the viscous sol is spun, the fibers formed are dried in a space having a relative humidity of 55% to further remove water and volatiles.

After drying, the fibers are sintered at a temperature in the range of 1100°–1400° C. to generate the final α-alumina fibers with desired crystallinity and to complete the removal of porosity.

During the entire heating process, phase transition from amorphous to crystalline state occurs in the alumina. However, when the temperature is raised to 1100° C., the final and most stable phase is α-alumina.

The following specific examples are intended to demonstrate this invention more fully without acting as a limitation upon its scope, since numerous modifications and variations will be apparent to those skilled in the art.

EXAMPLE 1

Preparation of Aluminum Hydroxide Sol

Aluminum nitrate [$Al(NO_3)_3 \cdot 9H_2O$] was hydrolysed with water at room temperature, wherein the molar ratio of aluminum nitrate to water was 1:10. Aluminum particles were treated with mercuric chloride solution or bromine solution so as to be easily soluble in the aluminum nitrate solution and then were added to the aluminum nitrate solution to give a reaction mixture, wherein the molar ratio of aluminum particles to aluminum nitrate was 1.87.

The reaction mixture was refluxed at about 100°–110° C. for 2–3 hours until the aluminum particles were completely dissolved, yielding a pale yellow transparent aluminum hydroxide sol.

EXAMPLE 2

Preparation of α-alumina fibers

The sol obtained from example 1 was appropriately aged until the viscosity of it reached a value within 1–4000 poises for spinning. Afterwards, the sol with a suitable viscosity for spinning was spun. The fibers formed were dried at room temperature, 55% relative humidity for 30 minutes to obtain a transparent hardened alumina fiber precursor.

Finally, the fiber precursor was heated from room temperature to 1300° C. at a heating rate of 3° C./min and then was sintered at 1300° C. for 4 hours. The resultant α-alumina crystalline fiber displayed high purity, full density and contained no pores. The crystallite size of the s-alumina fiber was about 1.2 μm.

From the above results, it is found that using aluminum nitrate as a starting material to produce α-alumina fibers according to the present invention has the advantages described below. Aluminum nitrate is desirably inexpensive and readily obtained, and the α-alumina fiber formed is of high purity, full density and contains no pores. The aging requirements for the aluminum hydroxide sol are at room temperature, in 55% relative humidity, which is readily feasible. Furthermore, the range of the aluminum hydroxide sol viscosity suitable for spinning, which is from 1 to 4000 poises, is relatively wide. Thus, it is convenient to prepare and store the aluminum hydroxide sol. Moreover, the e-alumina fiber precursors formed are not easily broken, therefore, there is significant potential for applying the process according to the present invention to mass production for continuous manufacturing α-alumina fibers.

What is claimed is:

1. A process for producing α-alumina fibers, comprising the following steps of:

(a) preparing a reaction mixture including aluminum nitrate [$Al(NO_3)_3 \cdot 9H_2O$], water and aluminum particles;

(b) refluxing the reaction mixture until the aluminum particles are completely dissolved to give an aluminum hydroxide sol;

(c) aging the aluminum hydroxide sol to a viscosity suitable for spinning;

(d) spinning the viscous sol obtained from step (c) into fibers; and (e) drying and sintering the fibers obtained from step (d) to give α-alumina fibers.

2. The process as claimed in claim 1, wherein the aluminum particles are treated with a halogen-containing solution so as to be easily soluble in the reaction mixture.

3. The process as claimed in claim 1, wherein the halogen-containing solution is selected from the group consisting of mercuric chloride solution and bromine solution.

4. The process as claimed in claim 1, wherein the refluxing is carried out at 100°–110° C. for 2–3 hours.

5. The process as claimed in claim 1, wherein the viscosity suitable for spinning is in the range of 1–4000 poises.

6. The process as claimed in claim 1, wherein the drying of step (e) is carried out at room temperature, in 55% relative humidity for 30 minutes.

7. The process as claimed in claim 1, wherein the sintering of step (e) is carried out at a temperature in the range of 1100°14 1400° C. for 4 hours.

* * * * *